United States Patent [19]

Bertelson

[11] 4,116,835
[45] Sep. 26, 1978

[54] POLLUTION CONTROL SYSTEM

[75] Inventor: Alexander Bruno Bertelson, Tinton Falls, N.J.

[73] Assignee: Savage Technical Services, Inc., Clark, N.J.

[21] Appl. No.: 785,789

[22] Filed: Apr. 8, 1977

[51] Int. Cl.² .................................................. B01D 29/08
[52] U.S. Cl. .................................... 210/100; 210/255; 210/259; 210/317; 210/336; 210/DIG. 5
[58] Field of Search .................... 210/23 R, 259, 336, 210/40, DIG. 5, 27, 255, 317, 73 W, 100

[56] References Cited

U.S. PATENT DOCUMENTS

| | | | |
|---|---|---|---|
| 1,121,994 | 12/1914 | Ellis | 210/27 |
| 1,245,721 | 11/1917 | Iki | 210/317 X |
| 1,290,820 | 1/1919 | Winkel | 210/255 X |
| 3,503,514 | 3/1970 | Lawson | 210/336 X |
| 3,527,701 | 9/1970 | Weiler | 210/40 |
| 3,565,252 | 2/1971 | Sheehy et al. | 210/259 X |
| 3,752,762 | 8/1973 | Cincotta | 210/40 X |
| 3,794,583 | 2/1974 | Rhodes | 210/40 X |
| 3,948,767 | 4/1976 | Chapman | 210/DIG. 5 |

Primary Examiner—Frank A. Spear, Jr.
Attorney, Agent, or Firm—Jospeh P. Nigon

[57] ABSTRACT

Oil and other contaminants are separated from aqueous effluents by a system which includes means for introducing the contaminated aqueous effluents into a separation zone where they are passed through the labyrinth course of a coalescing chamber to separate oil particles. The oil is removed by means of a skimmer and moved into an oil storage area. The aqueous effluents are then passed from the bottom of the separation zone to an extraction zone where they are passed through a bed of a material capable of adsorbing hydrocarbons and other pollutants. The effluent may then be discarded or may be moved through a fail safe system designed to assure that hydrocarbon removal is complete in all instances.

6 Claims, 4 Drawing Figures

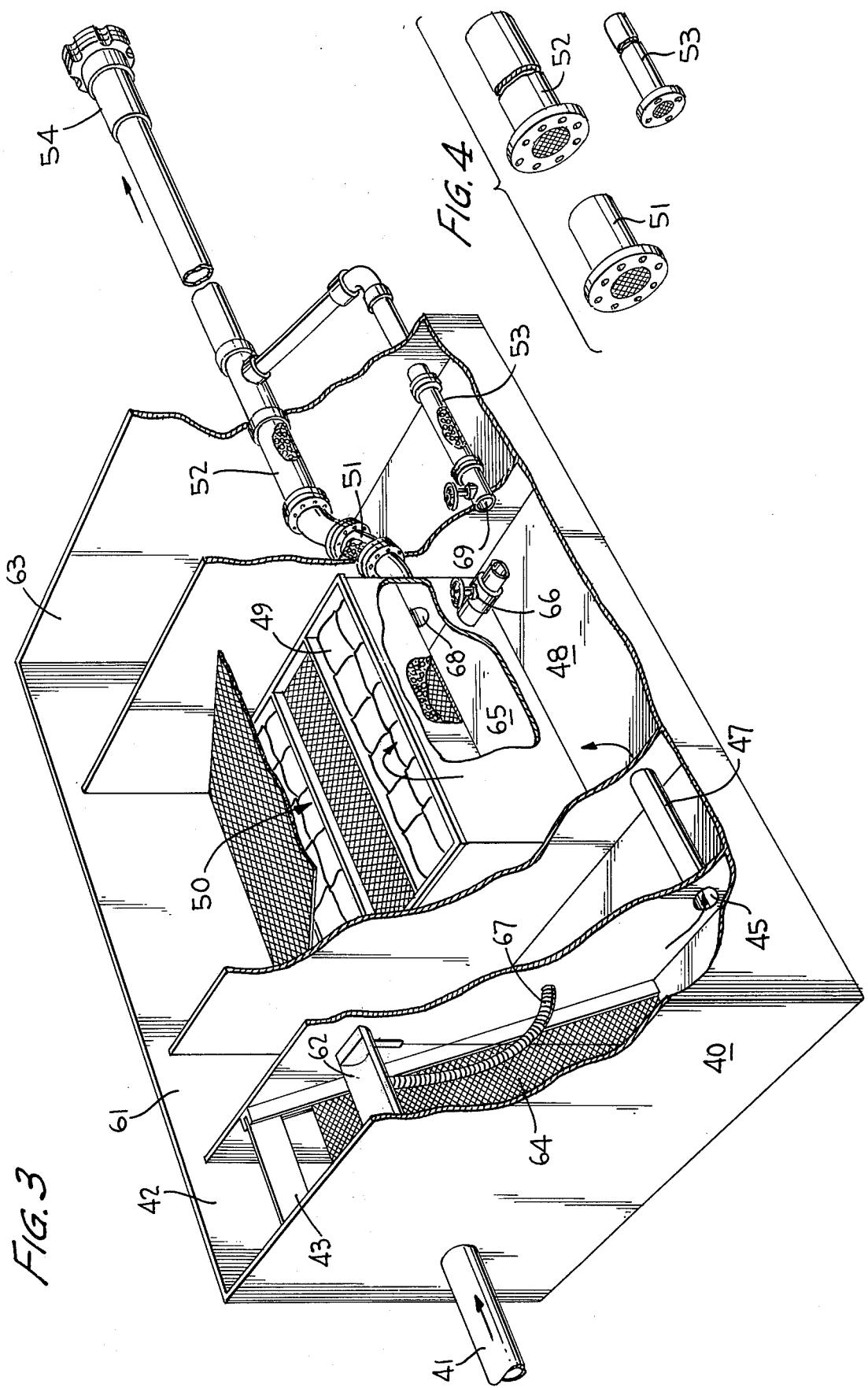

POLLUTION CONTROL SYSTEM

BACKGROUND OF THE INVENTION

Several types of plants are faced with the problem of disposing aqueous effluents that contain relatively small quantities of hydrocarbons, and other pollutants such as iron, fly ash, and other dissolved and/or suspended solid materials.

Tank farms and related systems also have the problem of removing the hydrocarbons and other pollutants from the surface water in these areas prior to this water leaving their premises. Oil is frequently present in emulsified form in this surface water and is very difficult to separate from the water. The standards promulgated by the Environmental Protection Agency limit the discharge to water containing no more than about ten parts per million of oil per part of water. At present there is no simple, reliable system for separating trace amounts of oil and other suspended, miscible, and dissolved contaminants from contaminated water in one system.

THE INVENTION

I have now invented a reliable system for removing hydrocarbon and other contaminants such as iron and other suspended, miscible, or dissolved contaminants from aqueous effluents in a system which comprises a separation and an extraction zone. The aqueous effluents are passed through a coalescing chamber in a separation zone that contains a plurality of screen-type grids that aid in the physical separation of the oil. The aqueous effluents are then moved through a contact extraction zone capable of adsorbing any remaining hydrocarbons and other pollutants.

One embodiment of the system includes a fail safe zone which contains a material that swells on contact with hydrocarbons and is capable of cutting off the flow of the liquid through the system if a catastrophic spill occurs.

The system is capable of reducing the hydrocarbon content to less than ten parts per million; the iron content to less than one part per million; and the total solids content to less than five parts per million.

PREFERRED EMBODIMENT

The invention is more clearly understood with reference to the following detailed specification read in conjunction with the drawings wherein, FIG. 1 is a side view of one embodiment of the invention;

FIG. 3 is a plan view of a third embodiment of the invention designed to be positioned below ground.

Figure 1:
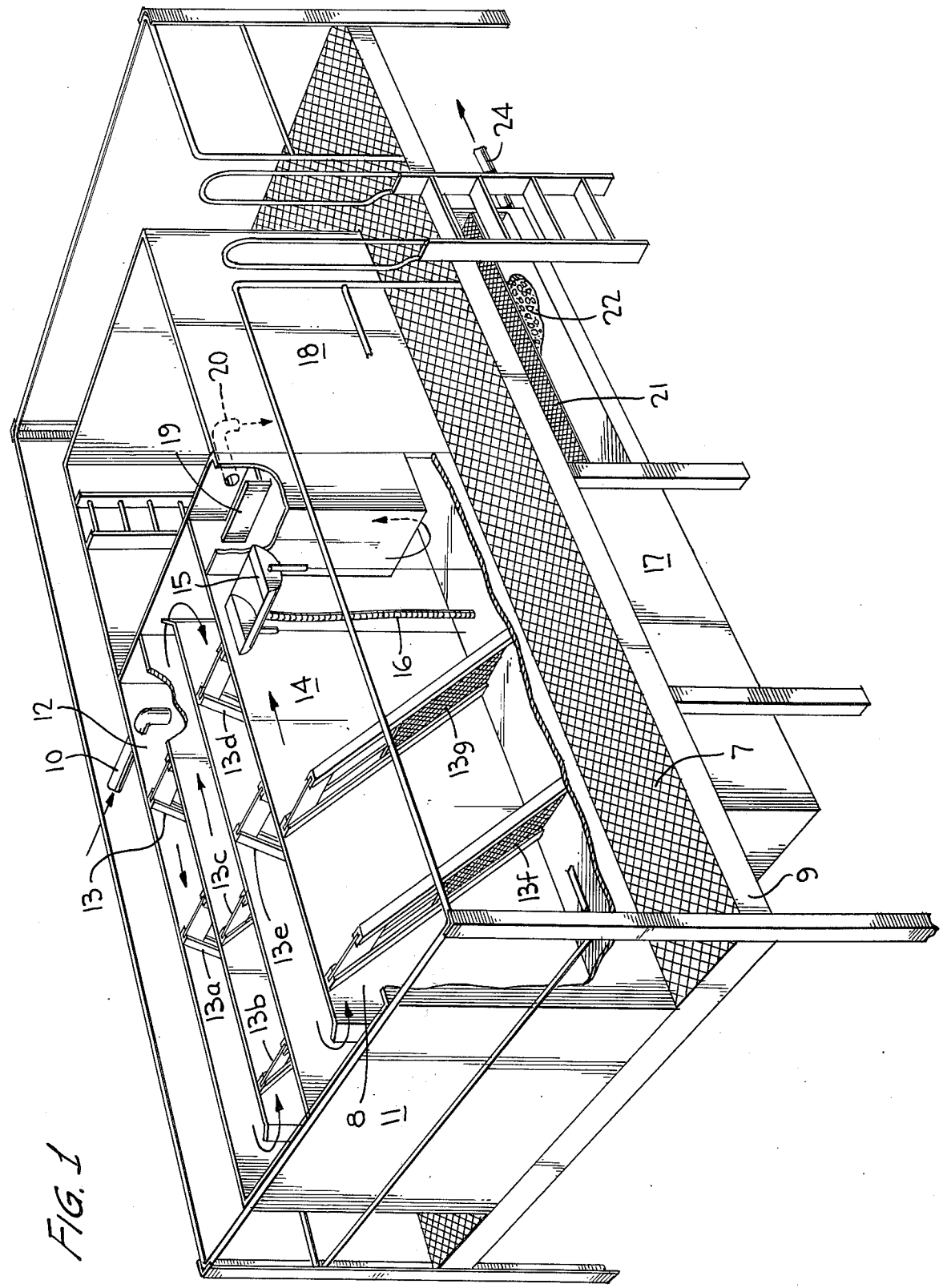

Referring now to FIG. 1, there is shown a structure consisting of a frame 9 supporting a walkway 7, a tank 11 containing a separation zone 8 divided into a labyrinthlike coalescing chamber 12, an oil accumulation chamber 17, and an extraction chamber 18 connected to an extraction bed 21. The tank 11 is equipped with an orifice 10 leading to the coalescing chamber 12 containing a series of coalescing screens or grids 13 and 13 $a - g$ positioned at an angle in the labyrinthlike coalescing chamber 12. The separation zone also contains a skimming device 15 for removing oil separated by the coalescing screens. The skimmer is connected by line 16 to the oil accumulation chamber 17. A weir 19 connects the separation zone 8 and the extraction zone 18 through a line 20. A chamber 18 is positioned above the extraction bed 21 which contains a composition that adsorbs hydrocarbons and many other pollutants. The effluent from the extraction zone passes through the line 24 to the sewer or other water disposal systems.

Figure 2:
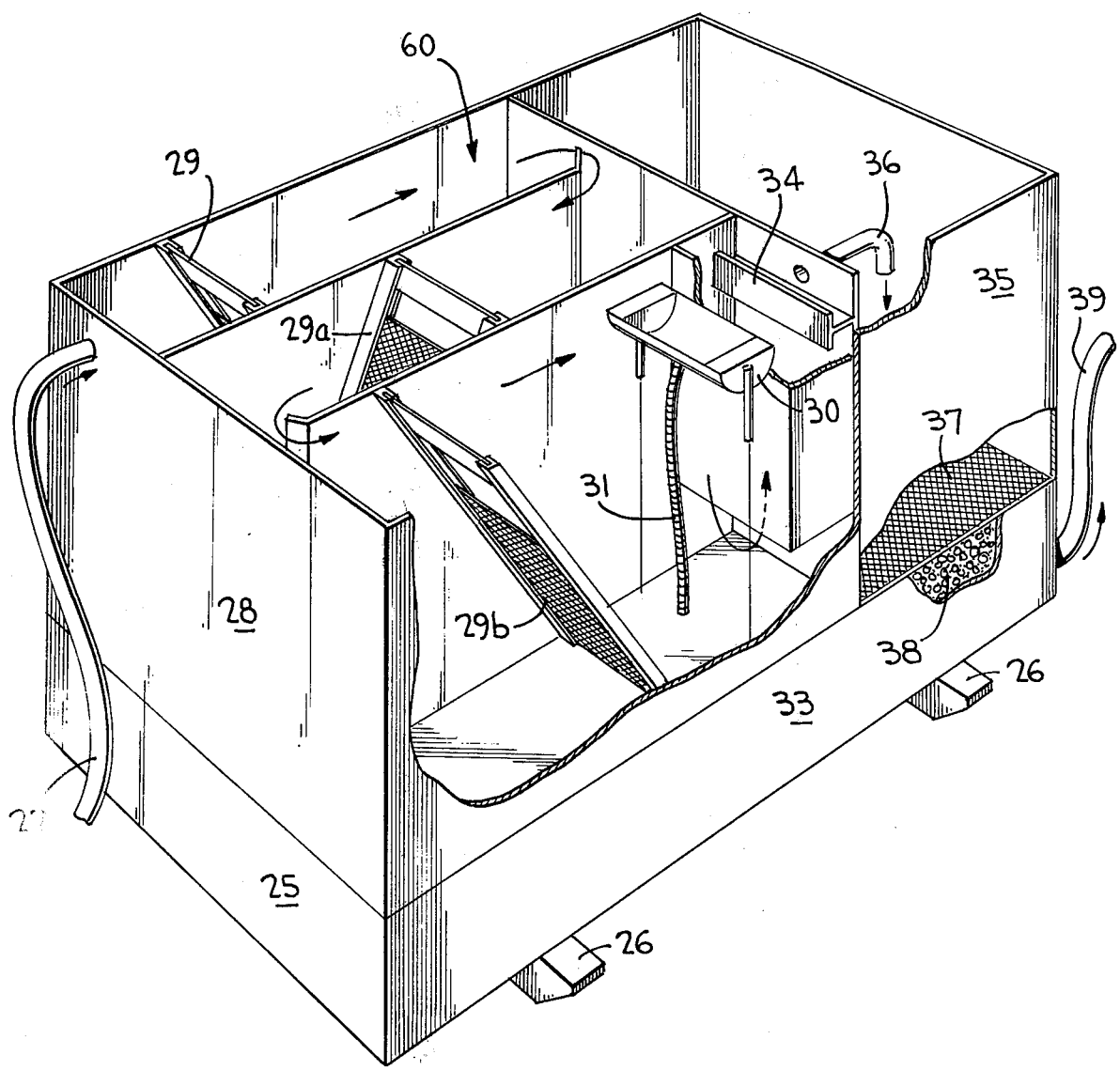
FIG. 2 is a plan view of the second embodiment of the invention.

Referring now to FIG. 2 which is a portable apparatus. The apparatus consists of frame 25 equipped with a skid 26 that supports the structure and facilitates handling by conventional fork lift equipment. The inlet line 27 is connected to the separation zone 28 which contains a series of coalescing screens 29, 29$a$, and 29$b$ positioned in a labyrinthlike. coalescing chamber 60. The separation zone also contains a skimming device 30 connected through line 31 to an oil accumulation chamber 33. The separation chamber 28 is connected to the extraction chamber 35 by means of a weir 34 and an outlet 36. The effluent from the extraction chamber 35 passes through the extraction unit 37 filled with an adsorbtive material 38 and passes out the line 39 to the sewer or other suitable disposal.

Referring now to FIG. 3 which is a plan view of a structure designed to be placed underground. The structure consists of a support 40 containing a separation zone 42, an oil storage area 61, and an extraction unit 50. An inlet pipe 41 is connected to the separation zone 42 which contains a coalescing unit 43 supporting a grid 64 for aiding the physical separation of the oil. The oil thus separated is collected in a skimmer 62 and passes into the oil collection unit 61 through the pipe 67. The effluent from the separation chamber 42 passes through the orifice 45 and the line 47 into the extraction chamber 48. The extraction chamber contains an extraction bed 50, positioned above a collection area 65, filled with bags 49 of a material that is capable of extracting oil and several other pollutants. Extracting unit 48 is connected to the fail safe unit 51 and 52 through orifice 68 which passes through a dry compartment 63 designed for servicing the unit. The fail safe unit consists of two separate areas 51 and 52. Area 51 is filled with a material that swells on contact with hydrocarbons, and is capable of shutting off flow through the system. Area 52 is an after-extractor device that picks up any hydrocarbon that may escape through area 51 during its swelling/closing action time interval.

The device also contains a bypass connected to the collection area 65, through the valved pipe 66 and the orifice 69. The bypass is filled through a portion of its length with the same material used in extraction bed 50. This permits draining collection chamber 65 and extraction chamber 48 for servicing and removing what pollutant traces in water from chamber 48 that had not passed through extraction bed 50.

FIG. 4 is an exploded view of the structure 51, 52, and 53 of FIG. 3 showing the components filled with their functional materials. Structure 51 contains a material that expands upon contact with hydrocarbons; 52 and 53 contain a contact pollutant extraction material such as is used in extraction bed 50.

In operation of the structure shown in FIG. 1, contaminated plant effluent is pumped into the separation unit 8 through the inlet 10 and passes through the labyrinthlike coalescing chambers. During its' 32 feet of flow path, the liquids pass through eight coalescing screen/grids 13, 13$a$, $b$, $c$, $d$, $e$, $f$, and $g$. These screen/grids are coated with a material that repels water and attracts oil particles. As the small oil particles make contact with each of the structures they tend to cling; following particles touch and fuse forming larger particles or globules increasing the buoyancy and the rising rate. If the force of the water flow pushes many of the still small globules free from one screen/grid, they are caught up in the next screen/grid. These screen/grids are positioned at an angle to facilitate upward flotation and are removable for easy cleaning and maintenance.

The separated oil is removed through the skimmer 15 which is connected by line 16 to the oil storage unit 17 where the oil is stored for later disposal. Water from the bottom of the separation zone flows up over the weir 19 through the inlet 20 into the extraction chamber 18. Here the water accumulates a head of six feet and passes through the extraction bed 21. The extraction bed is filled with a synergistic composition of materials 22 that adsorbs hydrocarbons, iron, suspended solids, and many other pollutants. The effluent from the extraction unit 22 flows through the pipe 24 to the sewer or some other suitable disposal.

The structure shown in FIG. 2 is a portable unit designed to handle pumped effluent at throughputs in the 30 to 40 gallons per minute range and is particularly well adapted to disposing of water used for hydrostatically testing in ground tanks at the site, for example. Only a small part of the throughput is taken away from the site for suitable disposal.

In operation, contaminated water enters the unit 25 through line 27 and flows through ten feet in the labyrinth path of the coalescing chamber 60. A series of three screens 29, 29a, and 29b, coated with a material that repels water and attracts oil particles, are designed to induce and hasten the coalescing of small oil particles to form larger buoyant globules which rise and are skimmed off in the skimmer 30 and pass through the flexible pipe 31 into the oil collection unit 33.

The partially purified effluent passes over the weir 34 through the line 36 and into the extraction chamber 35. A gravity head of approximately 48 inches is developed in the chamber 35 and the liquid passes through the contact extraction bed 37. The hydrocarbons, iron, and dissolved and suspended solids plus certain miscible liquids are adsorbed by the specially formulated extraction material 38. The purified effluent moves out through the line 39 for disposal to the sewer or any other convenient place.

The structure shown in FIG. 3 is an inground unit particularly useful for monitoring rainwater runoff from contaminated water areas, such as dikes, transport unloading, and truck loading rack areas. A fail safe system is designed to shut off flow through the system in the event of a catastrophic spill.

In operation of the system, a contaminated effluent enters the structure 40 through pipe 41 into the separation chamber 42 where oil separation is hastened and any larger solids are held back by the coalescing unit 43 supporting the screen 64. The oil collected in the separation chamber moves through the skimmer 62 into the oil collection area 61. The clearer water is removed from the bottom of the separation unit through the orifice 45 and the line 47 into the extraction chamber 48. The effluent rises until it flows into the extraction bed 49 which is filled with extraction cartridge bags designed to hold extraction material and allow free flow of the effluent. The extraction chamber uses an interlocking, gasketless clamp system with replaceable extraction cartridge bags. The water leaving the extractor bed flows into the collection area 65 and through the orifice 68 into the fail safe system.

The fail safe monitoring system consists of units 51 and 52. Unit 51 is filled with a material that expands on contact with hydrocarbons and creates a valve action that is capable of shutting off the flow through the unit in the event of a catastrophic spill. Unit 52 is an afterextractor that handles what hydrocarbons escape during the swelling/shut off interval. The dry area 63 is designed to facilitate switching the system to the bypass and changing the units 51 and 52 when necessary. The fail safe system is equipped with a bypass 53 that allows for draining the unit prior to servicing.

The bypass is activated by opening the valve 66 and allowing the liquid accumulated in the collection area 65 to flow into the area 48 and through the orifice and vlve 69 into the bypass 53. The area 53 of the bypass is also filled with material similar to what is used in the extraction bed to remove traces of pollutants in any water that had not passed through the extraction bed prior to discharge to the sewer or any other proper disposal.

These systems are advantageous over the prior art system in that they are not only capable of reducing the hydrocarbon content of waste waters down to the less than one to five parts per million range, but also the total other pollutant content to less than five parts per million. These systems combine induced coalescing with gravity separation plus contact extraction techniques to achieve these results. The units are compact and thus save valuable real estate; they are easy to maintain and can be utilized as an inground unit or above ground stationary or movable unit depending on the particular circumstances. The systems have extended capability to also extract emulsified particles, dissolved iron, colloidal suspensions, i.e., carbon (fly ash) and many water miscible solvents, etc. The systems can be used by themselves or added onto existing equipment to upgrade performance by removing the last traces of hydrocarbons or other pollutants from waste water.

Obviously, many modifications and variations of the invention may be made without departing from the essence and scope thereof, and only such limitations should be applied as are indicated in the appended claims.

What is claimed is:

1. A unitary apparatus for removing hydrocarbons and other contaminants from aqueous effluents, comprising,
   a. a unitary tank having a bottom and substantially vertical side and end walls;
   b. a first vertically disposed wall adapted and constructed to divide said tank into a separation zone and an extraction zone;
   c. said separation zone having at least one vertical baffle having one vertical end connected to a wall and the other end in spaced relationship to an opposite wall and adapted and constructed to provide a tortuous horizontal flow path for said aqueous effluents;
   d. an aqueous effluent entrance orifice at substantially one end of said flow path of said separation zone;
   e. at least one foraminous web positioned to interrupt said flow path extending from substantially said bottom upwardly at an angle in a direction against said flow path;
   f. said foraminous web being constructed of an oleophilic material whereby said hydrocarbons coalesce into droplets on said foraminous web and then accumulate on the surface of said effluent;

g. skimmer means positioned near the other end of said flow path of said separation zone whereby said accumulated hydrocarbon is removed from said effluent;

h. said tank having a horizontally disposed member substantially coextensive with said separating zone adapted and constructed to form a reservoir for said hydrocarbon material between said bottom and said separating zone;

i. means for fluidly connecting said skimmer and said reservoir whereby hydrocarbons are discharged from said skimmer into said reservoir;

j. means fluidly connecting said separation zone and said extraction zone whereby substantially hydrocarbon free effluent is charged into said extraction zone;

k. a horizontally positioned foraminous web dividing said extraction zone;

l. a mass of adsorbing material positioned below said foraminous web for adsorbing any additional contaminants in said effluent;

m. and means in said tank below said foraminous web to discharge cleansed effluent from said tank.

2. The unitary apparatus for removing hydrocarbons and other contaminants from aqueous effluents as claimed in claim 1 wherein said coalescing chamber contains a series of screen type grids which are coated with a material that repels water and attracts liquid hydrocarbon particles to facilitate separating liquid hydrocarbon particles from said effluent.

3. The unitary apparatus for removing hydrocarbons and other contaminants from aqueous effluents as claimed in claim 1 wherein said means for discharging cleansed effluent from said tank includes a fail safe apparatus capable of shutting down the apparatus in case of a catastrophic spill.

4. The apparatus according to claim 3 wherein said fail safe apparatus consists of a line filled with a material that swells on contact with hydrocarbons and acts as a valve to shut off flow through the system when a high concentration of hydrocarbons is present.

5. The apparatus according to claim 4 wherein said fail safe apparatus includes an after-extractor member that removes pollutants escaping through the automatic closure apparatus during the swelling/shut off interval.

6. The unitary apparatus for removing hydrocarbons and other contaminants from aqueous effluents as claimed in claim 1 wherein said extraction zone contains a bed of material capable of absorbing hydrocarbons and reducing the hydrocarbon concentration in said effluents to less than five parts per million.

* * * * *